United States Patent [19]

Sancoff et al.

[11] Patent Number: 5,397,303

[45] Date of Patent: Mar. 14, 1995

[54] LIQUID DELIVERY DEVICE HAVING A VIAL ATTACHMENT OR ADAPTER INCORPORATED THEREIN

[75] Inventors: Gregory E. Sancoff, Rancho Sante Fe; Mark C. Doyle, San Diego; Frederic P. Field, Solana Beach, all of Calif.

[73] Assignee: River Medical, Inc., San Diego, Calif.

[21] Appl. No.: 105,284

[22] Filed: Aug. 6, 1993

[51] Int. Cl.⁶ .............................................. A61M 37/00
[52] U.S. Cl. ........................................ 604/82; 604/413
[58] Field of Search ............................... 604/82–92, 604/249, 256, 403, 410–414, 416; 206/219, 222; 141/330

[56] References Cited

U.S. PATENT DOCUMENTS

| | | |
|---|---|---|
| 3,718,236 | 2/1973 | Reyner et al. . |
| 3,840,009 | 10/1974 | Michaels et al. . |
| 3,894,538 | 7/1975 | Richter . |
| 4,019,512 | 4/1977 | Tenczer ............... 604/905 |
| 4,049,158 | 9/1977 | Lo et al. . |
| 4,203,441 | 5/1980 | Theeuwes . |
| 4,360,131 | 2/1983 | Reyner . |
| 4,373,341 | 2/1983 | Mahaffy et al. . |
| 4,376,500 | 3/1983 | Banks et al. . |
| 4,379,453 | 4/1983 | Baron . |
| 4,410,321 | 10/1983 | Pearson et al. ............. 604/82 |
| 4,478,044 | 10/1984 | Magid . |
| 4,491,250 | 1/1984 | Liebermann . |
| 4,507,116 | 3/1985 | Lieinsohn . |
| 4,510,734 | 4/1985 | Banks et al. . |
| 4,513,884 | 4/1985 | Magid . |
| 4,518,103 | 5/1985 | Lim et al. . |
| 4,553,685 | 11/1985 | Magid . |
| 4,583,971 | 4/1986 | Bocquet et al. ............. 604/82 |
| 4,606,734 | 8/1986 | Larkin et al. ............. 604/84 |
| 4,614,515 | 9/1986 | Tripp et al. . |
| 4,640,445 | 2/1987 | Yamada . |
| 4,646,946 | 3/1987 | Reyner . |
| 4,648,955 | 3/1987 | Maget . |
| 4,675,020 | 6/1987 | McPhee . |
| 4,679,706 | 7/1987 | Magid et al. . |
| 4,687,423 | 8/1987 | Maget et al. . |
| 4,759,756 | 7/1988 | Forman et al. ............. 604/413 |
| 4,781,679 | 11/1988 | Larkin ............. 604/88 |
| 4,804,366 | 2/1989 | Zdeb et al. . |
| 4,850,978 | 7/1989 | Dudar et al. . |
| 4,886,514 | 12/1989 | Maget . |
| 4,898,209 | 2/1990 | Zbed . |
| 4,923,095 | 5/1990 | Dorfman et al. . |
| 4,936,829 | 6/1990 | Zdeb et al. . |
| 4,936,841 | 6/1990 | Aoki et al. ............. 604/713 |
| 5,022,564 | 6/1991 | Reyner . |
| 5,024,657 | 6/1991 | Needham et al. . |
| 5,049,129 | 9/1991 | Zdeb et al. . |
| 5,054,651 | 10/1991 | Morane . |
| 5,080,652 | 1/1992 | Sancoff et al. . |
| 5,106,374 | 4/1992 | Apperson et al. . |
| 5,116,316 | 5/1992 | Sertic et al. . |
| 5,137,186 | 8/1992 | Moran . |
| 5,167,631 | 12/1992 | Thompson et al. . |

*Primary Examiner*—John D. Yasko
*Attorney, Agent, or Firm*—Knobbe, Martens Olson & Bear

[57] ABSTRACT

A device is disclosed which provides direct and effective incorporation of material (such as medicine) from a separate container into the contents of a liquid dispensing device. The device has a hollow sleeve extending outwardly, an openable closure, a securing member which engages a mating member on the container, and a conduit (such as a needle) to provide fluid communication between the device and the container, with the fluid communication occurring upon attachment of the container to the device. The device can also provide for attaching the separate container to the dispensing device but without initially establishing liquid communication between the two.

20 Claims, 6 Drawing Sheets

LIQUID DELIVERY DEVICE HAVING A VIAL ATTACHMENT OR ADAPTER INCORPORATED THEREIN

BACKGROUND OF THE INVENTION

1. Field of the Invention

The present invention relates to liquid delivery devices such as medicine dispensers. More particularly it relates to liquid delivery devices having an adapter that permits a substance in a vial or other separate container to be transferred to such delivery device.

2. Description of the Prior Art

There are a number of types of liquid delivery devices or dispensers that are intended to provide for the delivery of a liquid medication to a patient under controlled conditions. One is shown in U.S. Pat. No. 5,080,652 to G. E. Sancoff, et al. All such delivery devices utilize mechanisms to cause a liquid contained therein (often a solution containing one or more medications) to be dispensed either continually or intermittently from the container, normally through a conduit which terminates at its distal end with an attachment for intravenous, subcutaneous, or intraparenternal administration to a patient.

Such devices may be stored in an empty condition and then filled with the liquid medication shortly before or at the time of administration of the medication to the patient. Alternatively, containers can be stored in a sealed condition but filled with a liquid medication or liquid medium, and at the time of administration the device is opened and the medication dispensed to the patient as indicated above. In many instances it is desirable to incorporate additional or different medications into the liquid medication already present in the device. In other instances where the device is filled with a neutral liquid medium, it is necessary to add the medication to that medium prior to dispensing to the patient. The latter commonly occurs when the particular medication to be delivered has a short shelf life or where it is effective only for a short period after being dispersed in the liquid medium.

In both of these cases, it is necessary to establish some sort of fluid connection between the device and the container holding the additional or separate medicine. With many devices this is either difficult or impossible to do, thus normally requiring a second administration of the additional or other medicine to the patient.

A primary failing of the prior art vial adapters has been the failure to provide a resealable attachment. Therefore, when a vial is disposed on the diluent source it cannot be removed without the loss of diluent or medication. Moreover, removal of the vial is preferable so as to minimize the volume of diluent and medicament lost in line.

Accordingly, a need exists for a vial adapter and an infusion pump with a vial adapter associated therewith that allow for the efficient and expeditious transfer of a medication into an infusion pump and that further allow the vial or other container with the medication to be removed, and the pump put on line to the patient.

SUMMARY OF THE INVENTION

The present invention provides several embodiments of adapters that can be used for the introduction of a medicament from a drug vial, for example, into an infusion pump or IV bag followed by the delivery of the medicament in a diluent to a patient. A profound feature of the present invention is that, in a preferred embodiment, it provides a mechanism to allow for the introduction of the drug or medicament to the pump and the delivery from the pump through a single port. In a preferred embodiment, this is achieved through the use of a resealable valve in a lumen in the vial adapter.

This aspect of the present invention stands in stark contrast to the prior art. In the prior art, many complicated structures were used to achieve the objective of the present invention.

In accordance with a first aspect of the present invention, there is provided a system for connecting a diluent source within a first container to a second container containing a medication, comprising a first connector housing having a proximal and a distal end, the first connector housing having a first open end on its proximal end that is adapted to receive and engage the second container, the first open end further comprising a piercing means attached thereto, the piercing means having a proximal end that is adapted to pierce a seal on the second container, the piercing means further defining a first lumen that extends from its proximal end to the distal end of the first connector housing, a second connector housing having a proximal end and a distal end and having a second lumen extending therethrough and being adapted to attach to a diluent source on its distal end, the second connector housing further comprising a valve that is ordinarily closed to prevent fluid communication through the second lumen, the first and second connector housings being adapted to slidingly and sealingly connect at the distal end of the first connector housing and the proximal end of the second connector housing, such that the first and second lumen are in fluid communication, means formed within the first lumen for opening the valve in the second housing connector such that sliding the first and second connector housings longitudinally relative to each other causes the actuating means to allow fluid communication through the valve and the first and second lumens.

In a preferred embodiment, the first open end further comprises a wall section constructed to receive the second container and direct the second container toward the piercing means. In another embodiment, the wall section further comprises engagement means on the wall section, the engagement means being adapted to releasably engage the second container within the wall section. In another embodiment, the second connector housing comprises a fitting on the distal end of the second connector housing, adapted for mechanically joining the second connector housing to the first container and providing fluid communication therefrom. In another embodiment, the second connector housing is directly attached to the first container and provides fluid communication therefrom. In a another embodiment, the system further comprises a removable wall section, the removable wall section acting to prevent the first and second connector housings from moving longitudinally with respect to one another. In another embodiment, the system further comprises a wall section, the wall section acting to form a seal between the first and second connector housings.

In accordance with another aspect of the present invention, there is provided a liquid dispensing device comprising a hollow casing having inner and outer sides, the inner side defining an interior which can contain a fluid, an opening in the casing providing fluid communication between the interior and the exterior of the casing, surrounding the opening and disposed on the outer side a hollow sleeve extending outwardly from the outer side, an openable closure in the sleeve, the closure being normally closed and being openable only from outside the casing, first securing means cooperating with the sleeve to engage mating means on a portion of a container, the container having an interior which can contain a substance and the container having an openable closure providing fluid communication between the interior and exterior of the container, fluid communication means at least partially within the sleeve to cause the openable closures to be open simultaneously and to provide fluid communication between the interiors of the device and the container through the opening, the fluid communication means being operated upon juxtapositioning of the container and the device with the portion of the contain engaging the sleeve and the mating means engaged with the first securing means, whereby the substance within the interior of the container will be communicated into the interior of the device while the container is secured to the device.

In a preferred embodiment, the device further comprises second securing means within the sleeve and spaced apart from the first securing means, the second securing means also engagable with the mating means, and spaced apart from the opening a sufficient distance that when the container and the device are juxtaposed with the portion of the container engaging the sleeve and the mating means engaged with the second securing means, the container and the device are secured together but neither openable closure is opening and no fluid communication exists between the interiors of the container and the device.

In another preferred embodiment, the device further comprises means to permit the container to be moved from engagement of the mating means with the second securing means to engagement with the first securing means, whereby the fluid communication means opens the openable closures and permits fluid communication between the interiors of the container and the device.

In another embodiment, the fluid communication means comprises a needle having a conduit disposed longitudinally thereof, the conduit having a length sufficient to have one end disposed within the interior of the container and another end disposed within the interior of the sleeve and to open both of the openable closures when the container and the device are juxtaposed with the portion of the container engaging the sleeve and the mating means engaged with the first securing means. In another embodiment, the fluid communication means further comprises means to provide gas communication between the interior and exterior of the container, such that when liquid is removed from the interior it can be replaced by gas drawn into the interior from the exterior through the gas communication means.

In still another embodiment, the gas communication means contains therein a filter to remove undesired materials from the gas prior to delivery of the gas to the interior of the container. In another embodiment, the first securing means comprises a radial flange on an exterior surface of the sleeve and the mating means comprises a corresponding radial groove on the exterior of the portion of the container, the flange and the groove being capable of being releasably engaged in interconnected securement. In another embodiment, the second securing means comprises a radial flange on an exterior surface of the sleeve and the mating means comprises a corresponding radial groove on the exterior of the portion of the container, the flange and the groove being capable of being releasably engaged in interconnected securement.

In another embodiment, the device further comprises a coupling member having a male end and a female end, the male end frictionally engaging the sleeve and the first securing means and the mating means comprising the frictional engagement, the female end having retaining means therein to retain the portion of the container, and the coupling member also having an aperture therein between the male and female ends for passage of the fluid communication means, such that the substance within the interior of the container will be communicated into the interior of the device through the fluid communication means while the container is secured to the device. In another embodiment, the coupling member is disengageable from the sleeve. In still another embodiment, the openable closure in the sleeve comprises a valve. In another embodiment, the openable closure in the container comprises a perforable membrane.

DETAILED DESCRIPTION OF THE PREFERRED EMBODIMENTS

The present invention is related to an attachment or an adapter that allows for the addition of a medication from a container holding the medication to a solution contained within a liquid delivery device. It will be understood that often drugs or medications, following their manufacture, are packaged within containers that allow the medication to be kept sterile. Glass vials are frequently used; glass is highly inert, very stable, is readily sterilizable, and can be used with virtually any medication, whether it is a solid or liquid. The vials usually have a rubber septum at their mouths that allow for the reconstitution, dilution, and/or simple transfer of the medication from the vial through use of a needle and syringe.

The present invention allows for similar ease of transfer without the need for the use of a needle and syringe. Rather, the invention allows a vial to be essentially attached to a liquid delivery device and the medication contained in the vial transferred to the device easily and without contamination. This is accomplished in the broadest sense by having a first connector sized to fit around the mouth of a drug vial that has a piercing means to perforate the septum in the vial, a channel extending from the connector that will allow the communication of the medication from the vial to the delivery device, and a second connector that is attached to the device. Preferably, the channel additionally contains means for preventing communication of the medication from the drug vial to the device and/or communication of the diluent from the device to the drug vial.

As discussed above, the medication contained in the drug vial can be a liquid or a solid and the principle of the invention is to move the medication from the vial to the liquid delivery device. When the medication is a liquid, it will be understood that it will easily flow through the channel into the delivery device. However, when the medication is a solid, it is necessary to reconstitute the solid. This may be accomplished either through adding a solvent to the solid while it is in the vial or a solvent in the device can be communicated through the channel to the vial and the reconstituted medication can be communicated back to the device.

The latter process is preferred, since, many medications are less stable in solution and begin to lose their efficacy the longer they are maintained in solution. This is a primary reason that such medications have been packaged and sold as solids in the first place. Therefore, it will be understood that it is highly advantageous to be able to reconstitute solid medications, just prior to administration to the patient.

Figure 1:
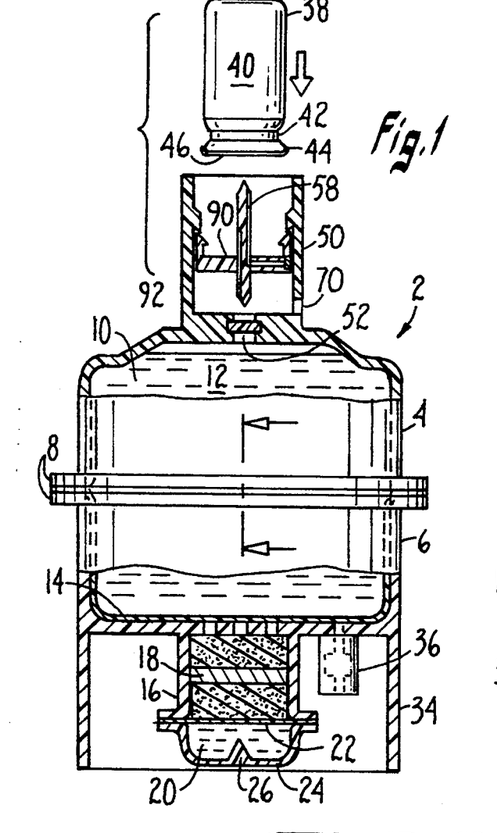
FIG. 1 is a side elevation view, with portions cut away, of one configuration of the dispensing device of the present invention.
Figure 2:
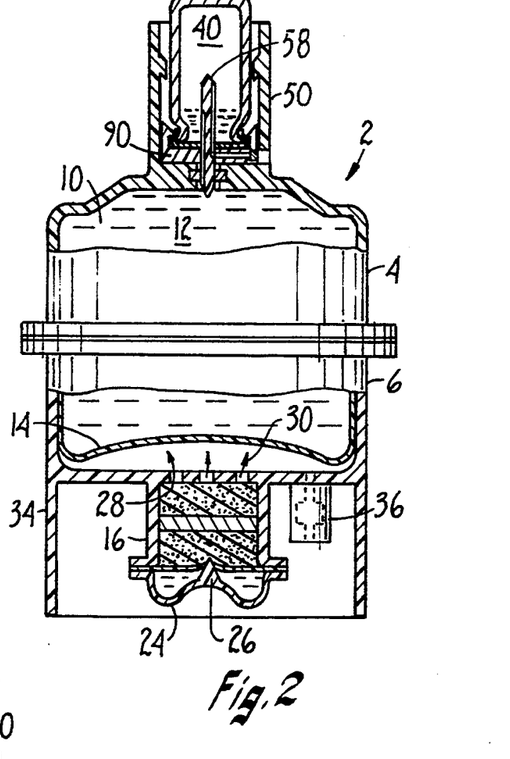
FIG. 2 is a similar view with pressurized infusion in operation.

The connector structure that meets the above-discussed requirements of the present invention will be best understood by reference to the drawings. FIGS. 1, 2, 4 and 11 show overall views of different embodiments of the present device with the connecting structure incorporated therein and showing the connection with the separate container, here illustrated as a vial. In FIGS. 1 and 2, the device shown is that described and claimed in co-pending U.S. patent application Ser. No. 08/105,327 the disclosure of which is hereby incorporated by reference. The details of the operation of that device, including the means for dispensing the contained liquid, may be understood by reference thereto.

A device 2 of this invention is commonly formed of two parts 4 and 6 which are joined in a convenient manner, as by mating flanges 8. The device is hollow with an interior 10 shown as filled with a liquid 12. The liquid 12 may be a medication itself, or it may be an inert carrier liquid into which a medication is subsequently incorporated, as will be described below.

It will be understood that the descriptions herein as to "medication" is merely for the purpose of example, and that a variety of other types of fluids and added materials, such as intravenous nutrients, may be mixed and dispensed with the device of this invention. Those skilled in the art will be well aware of the many materials which can be handled by this device, and can readily determine the optimum manner of handling any particular combination of materials.

Dispensing of the liquid is by means of motion of membrane 14 by the pressure of gas which is evolved by the reaction of two chemicals which are initially separated but are brought together and allowed to react and evolve the gas. The chemicals are conveniently housed in a well 16 attached to the wall of portion 6 of container 2. One of the chemicals is illustrated in the form of a solid pellet 18 and the other is in the form of liquid 20. The two are separated by membrane 22. When a flexible cap 24 surrounding liquid 20 is flexed, as shown in FIG. 2, a sharp protuberance 26 on the inside of dome 24 perforates membrane 22, allowing liquid chemical 20 to flow into contact with chemical 18, evolving gas which escapes through openings 28 as indicated by arrows 30, thus pushing membrane 14 forward as indicated in FIG. 2 and causing the liquid to be dispensed through outlet 32 (visible in FIG. 11). Membrane 14 is secured at its periphery by being clamped between the flanges 8 (designated as 8a and 8b in FIGS. 5 and 6).

If desired, the device 2 can have a skirt 34 surrounding the well 16 to allow the device to be placed on end and to protect the well 16 and dome 24 against accidental activation of the chemicals. Also present may be gas relief valve 36 which serves to control any overpressure from the evolving gas and also to allow the device 2 to be completely depressurized to ambient pressure once all of the liquid 12 has been dispensed.

For the purposes of illustration herein, the liquid 12 will hereafter be referred to simply as the carrier liquid, and it will be assumed that there is no medication initially present in liquid 12. It will of course be understood that this is solely for the purpose of illustration and that as noted above in fact there are many instances in which the liquid 12 may itself be a medication. The medicating substance 48 is initially contained in separate container 38, here illustrated as a vial. The medication 48 will be present within interior 40 of vial 38 and may be either in liquid form or in the form of a readily soluble solid material, usually a powder or granulated material. The vial 38 normally has a reduced collar area 42 widening to a lip 44, and is sealed by a membrane or cap 46. The purpose of the structure of the invention herein is to permit the medication 48 to be transferred from the vial 38 to the interior of the device 2 and there be incorporated into the carrier fluid 12.

Figure 3:
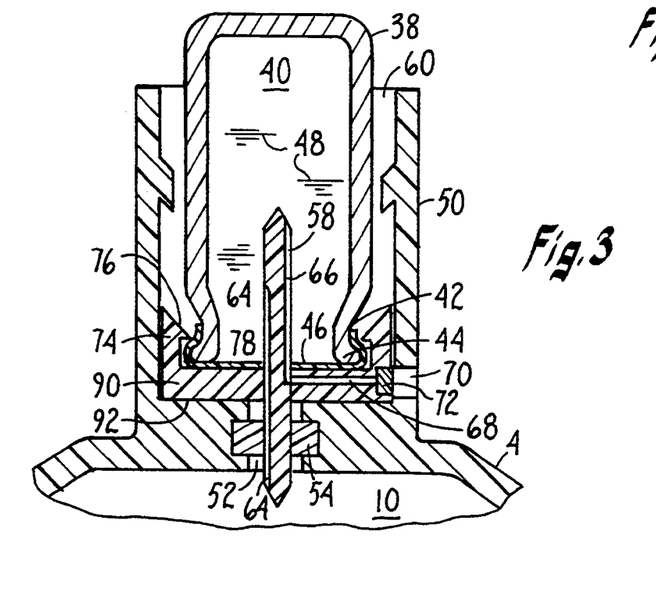
FIG. 3 is an enlarged view of the upper portion of FIG. 2.
Figures 9, 10, 11:
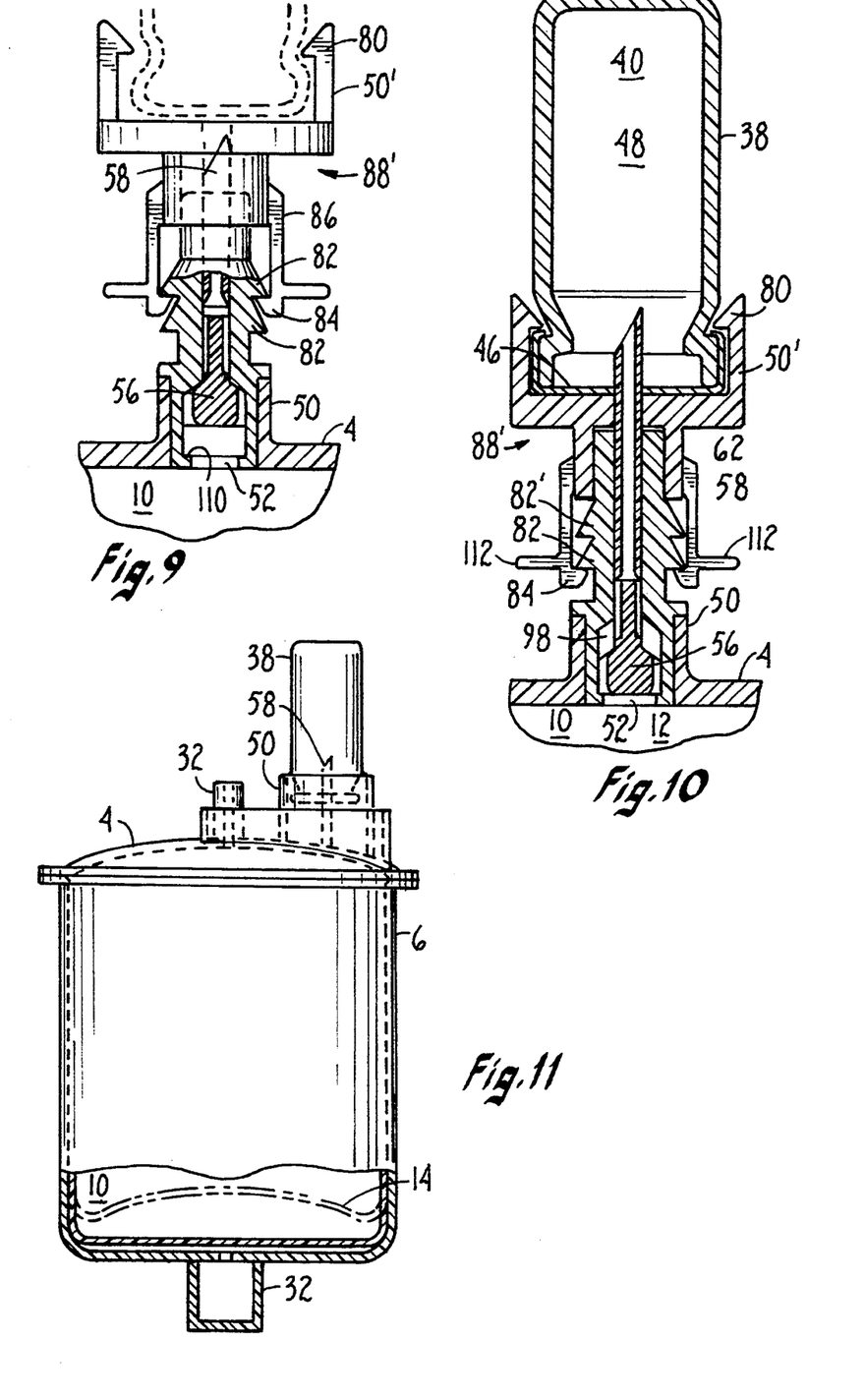
FIG. 9 is a partially cut away view of an alternative adapter arrangement in storage position.
FIG. 10 is a similar view with the vial in the adapter.
FIG. 11 is a side elevation view of a further configuration of the apparatus.

The concept is best understood by reference to FIG. 3. At the top of portion 4 is formed a sleeve-like member 50 which surrounds an opening 52 leading from the interior 10 of device 2 to the exterior of the device 2 in the open hollow middle of the sleeve 50. The inside diameter of the sleeve 50 is sufficiently large to be able to accommodate either the entire diameter of vial 38 as shown or at least the upper neck portion including neck 42 and rim 44 (as illustrated in FIGS. 10 and 11). The opening 52 is closed by any convenient means, either a plug 54 or preferably a one-way valve 56, which will be described in more detail below. Also present will be a fluid communication member, normally in the form of a needle 58, the structure of which will also be described below.

In one form of usage herein the vial 38 is positioned above the opening 60 of sleeve 50 and is pushed downward to make contact with needle 58. Needle 58 penetrates through the cap 46 of vial 38 and also penetrates through the closure 54 so that the opposite ends of needle 58 are positioned respectively in the medication 48 within interior 40 and in the carrier liquid 12 in interior 10. Fluid communication may be either by a hollow axial conduit 62 through needle 58, as shown in FIG. 10, or through a conduit formed by a groove 64 formed in one side of the needle 58. There is also preferably a second groove or conduit 66 (shown in FIG. 3) which passes through only a portion of the needle 58 and terminates in a junction with a conduit 68 which in turn extends to an opening 70 in sleeve which provides access to the ambient atmosphere. Thus as the medication 48 is withdrawn from the vial 38, air or other ambient gas can pass into the interior 40 through conduits 66 and 68 and hole 70 so that the formation of a vacuum and subsequently restricted flow of medication 48 is prevented. Typically there will also be a filter 72 present to remove any unwanted material from the ambient air as it passes from hole 70 into conduit 68.

Within sleeve 50, there will be a securing device 74 which contains means (illustrated in FIG. 3 as flange 76) to engage a corresponding depression or groove 78 in the neck 42 of vial 38. The flange 76, and usually the entire member 74, will have some degree of resiliency so that the vial 38 can be pushed forward so that rim 44 passes the flange or shoulder 76 and allows the grooved area 78 to cooperate with the flange 76 to prevent unwanted disengagement of the vial 38 from securement within the sleeve 50. Other means of securement can be in the form of tabs 80 formed on the outer end of sleeve 50 as shown in FIG. 10 or as radial structures in the forms of truncated cones 82 and 82' which are engaged by the hooks 84 of an external sleeve 86.

In some embodiments the sleeve will be in the form of a sleeve assembly which is formed of a sleeve 50 attached to the wall of portion 4 and a male/female coupling member 88 which has a secondary sleeve 50' into which the vial 38 fits. This use of the coupling device 88 permits the entire assembly to be removed from the device 2 so that the sleeve 50 and opening 52 can if desired be subsequently used as an outlet equivalent to outlet 32 once the contents of vial 38 have been incorporated into the fluid 12. In the embodiment shown in FIG. 1, the needle 58 is initially retained in a sliding plate 90 which is depressed downward by the positioning of vial 38, eventually coming to rest against the bottom 92 of sleeve 50 once the needle 58 has penetrated through the plug 54. The continued movement of vial 38 then causes the needle 58 to penetrate the cap 46 to establish a fluid communication between the vial 38 and the dispensing device 2.

Figures 4, 5, 6, 7, 8:
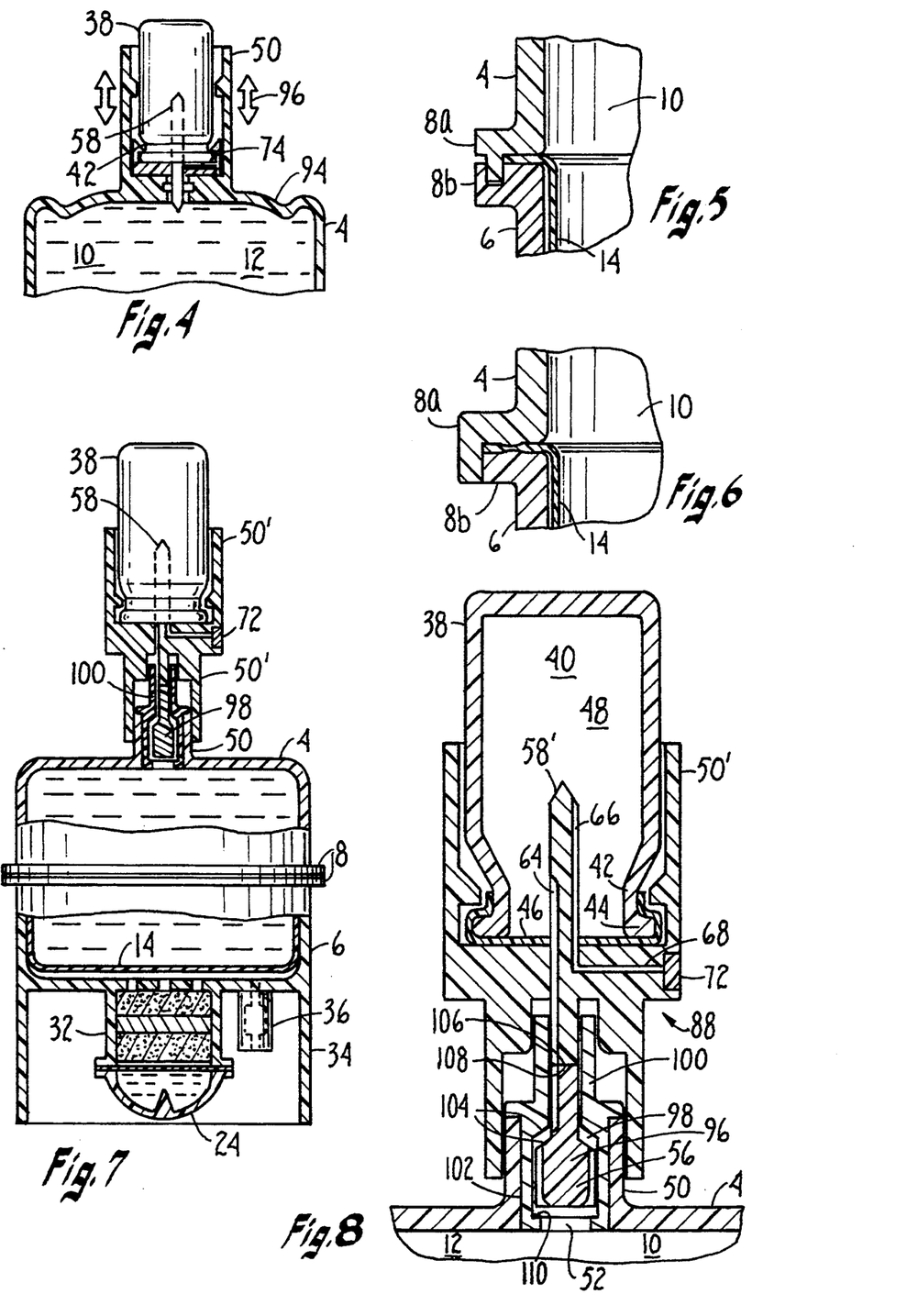
FIG. 4 is a view similar to a portion of FIG. 2 showing manual compression of the dispensing device.
FIG. 5 is an enlarged sectional view taken on line 5—5 of FIG. 1.
FIG. 6 is a sectional view similar to that of FIG. 5 showing an alternative rim configuration.
FIG. 7 is a side elevation view, with portions cut away, of an alternative device with a separate adapter to hold the vial.
FIG. 8 is an enlarged view of the upper portion of FIG. 7.

Once the vial is in place and secured, as shown in FIG. 3, the transfer of the contents 48 of vial 38 is commenced. The contents 48 may initially be under some pressure and therefore be forced through needle 58 into liquid carrier 12. Alternatively, however, it is preferred to have the top portion 4 of the device 2 be somewhat flexible, as illustrated in FIG. 4 at 94. When the portion 94 is flexed as indicated by arrows 96, the formation of a reduced pressure in interior 10 causes the contents 48 of vial 38 to be rapidly drawn out of the interior 40 and into fluid 12. Mixing is preferably accomplished by moving or pumping the fluid back and forth between the interior 40 and the fluid 12.

It is desirable to have a one-way valve 56 present in the sleeve 50, which valve is activated by contact with needle 58 when the vial 38 is pressed into place. This may be best seen in FIGS. 8 and 9. In this case, valve 56 is in the form of a bottle shaped plug 96, which conforms to a funnel-shaped interior 98 in a plug 100 which is fitted into sleeve 50 with an interference fit so that it is retained by friction on the mating surfaces 102. The plug 98 can be buoyant so that any fluid in container 12 forces it up into the opening 98 and closes the valve by contact between the surfaces 104. Or, in a preferred embodiment, the plug is restrained under mechanical pressure or is a compression fitting, which is opened by compression or force in a direction opposite the compression. When the needle 58 or needle-like structure 58' is pushed downward by the force of position of vial 38, the bottom 106 of the needle 58 or needle-like structure 58' contacts the top 108 of the plug 96 and forces it downward, thus opening the gap 98 to allow the liquid 12 to flow upward into the vial or the material 48 to flow toward the device 2 either because the material 48 is a liquid initially or because it becomes dissolved in that portion of the liquid 12 which passes into the interior 40 of vial 38. The plug 96 is prevented from falling out of the position by shoulders 110 of plug 100.

It is often desirable to be able to have the vial 38 and dispenser device 2 loosely attached together as for shipping and storing, but positioned apart so that the needle 58 or needle-like structure 58' is not penetrating into fluid communication with either of the vessels. The two vessels are positioned so that a simple push on the vial 38 will cause the two to come into operative position and the medication 48 and the carrier material 12 to be properly mixed. This permits, for instance, medications and carrier materials to be shipped and stored together and to be immediately available as in an emergency situation. For instance, storage of medications in a hospital emergency room must be such that the emergency room personnel can immediately obtain the exact medications needed and do not need to look for two or more separate containers which may be stored at different locations or of which one may have simply not been properly replenished. In order to avoid premature activation of the medication system and to preserve the shelf life of the medication for the maximum period, it is necessary however to have the vessels connected but remain sufficiently far apart that neither one becomes inadvertently opened and the contents then exposed and subject subsequent deterioration.

A structure to accomplish this is shown in FIG. 9 in which there are two separate securing conical flanges 82 and 82' which are spaced some distance apart. A second male/female device 88', with a top section similar to that as shown in FIG. 10 (but without the vial itself being shown) is used for this purpose. In operation, the member 88' is pushed downward only to the point where the tabs 84 engage the flange 82'. In this position, the vial 38 and device 2 are held securely together but are spaced apart far enough that the needle 58 does not penetrate the cap 46 of vial 38. Nor is it pushed downward to engage and open one-way valve 56. Subsequently when it is desired to join the two materials, the member 88' is pushed further down so that the tabs 84 engage the conical flange 82, which causes the needle 58 to be pushed downward to open plug 56 and to also penetrate and open the cap 46 by the downward movement of vial 38, all as illustrated in FIG. 10. The tabs 84 on member 88' can, if desired, be fitted with levers 112 which permit one to use thumb or finger pressure to spread the tabs 84 and release the member 88' when the vial 38 is empty.

In yet another embodiment, as shown in FIG. 12 through 17, the vial adapter consists essentially of male and female fittings, such as common Luer type fittings or locking Luers. One of the fittings is connected to the vial connector and one is connected to the delivery device. Further, preferably, one of the fittings contains a check valve, that acts to prevent the flow of liquid from the device. It will be appreciated, that in these constructions, either the male or the female fitting can be connected to the vial connector end or vice versa.

Figure 12:
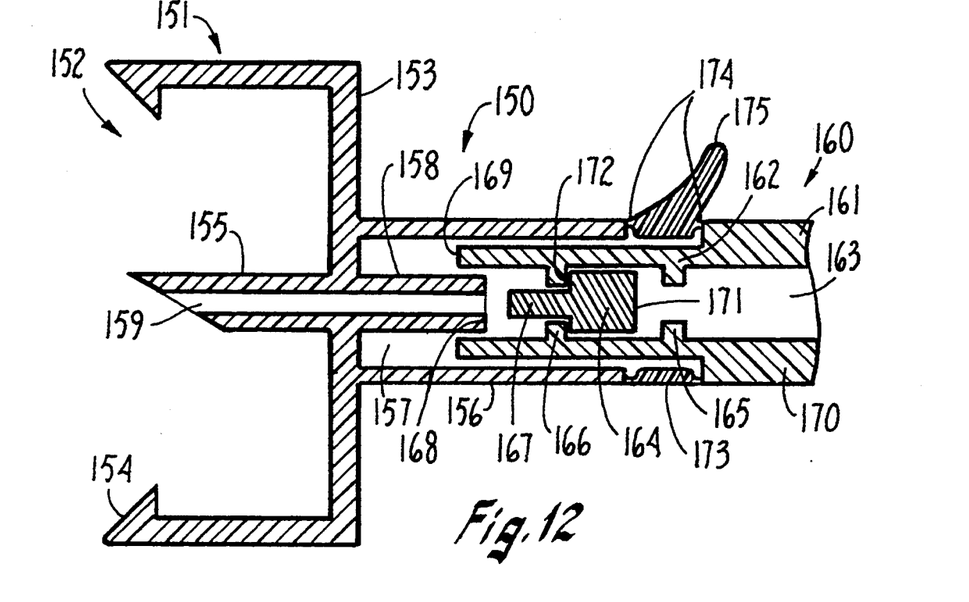
FIG. 12 is a side cross sectional view of a vial adapter in accordance with the present invention having its frangible strip in place, thereby preventing the two sections of the connector from moving relative to one another, thus maintaining the seal of the one-way valve.

Thus, referring now to FIG. 12, a drug vial adapter 150 is provided with a vial attachment end 151 that is sized and shaped to receive and lock in a drug vial (not shown). The vial attachment end 151 has an front open end 152 and a back closed end 153. As will be appreciated, drug vials typically have a rim that separates their mouth portion from their neck portion. The vial attachment end 151 of the vial adapter 150 has a vial catch 154 that is formed around the circumference of the front open end 152 of the vial attachment end 151 which acts to lock a drug vial to the vial adapter 150. In the center of the vial attachment end 151, a spike 155 is positioned. Thus, a drug vial is centered in the front open end 152 of the vial attachment end 151 and pushed longitudinally towards the back closed end 153 of the vial attachment end 151. Such action forces the spike 155 through a septum or a similar sealing means in a drug vial. A rim on a drug vial will catch on the vial catch 154, holding the vial in position with the spike 155 extending therein.

Extending distally from the back closed end 153 of the vial attachment end 151, the vial adapter 150 has a stem wall 156. The stem wall 156 defines a main channel section 157. Within the main channel section 157, a rod 158 extends. The rod 158 is in communication with the spike 155 through a first lumen 159, thus allowing fluid communication between a vial into the main channel section 157.

Distal to the vial attachment end 151 and its stem wall 156 is a connector 160. The connector 160 has a wall 161 and a recessed wall 162. The recessed wall is sized to fit within the main channel section 157 of the vial attachment end 151. Internal to the wall 161 and the recessed wall 162 of the connector 160, a second lumen 163 extends. Within the second lumen 163, there is a valve 164 that is kept in general longitudinal position with circumferential tabs 165 and 166. The valve 164, on its proximal end, has a recessed stem section 167 that extends proximally through the lumen 163 and the proximal most circumferential tab 166.

The distal end 168 of the rod 158 is sized to fit within the distal end 169 of the second lumen 163, thus allowing fluid communication between the first lumen 159 and the second lumen 163. However, the valve 164 acts to stop fluid flow from the proximal end 170 to the distal end 169 of the connector 160 because pressure exerted against the distal end 171 of the valve 164 forces the proximal edge 172 of the valve 164 against the proximal most circumferential tab 166.

The vial attachment end 151 of the vial adapter 150 is attached to the connector 160 through detachable wall section 173. The detachable wall section 173 acts to provide mechanical stability to the vial adapter as well as maintaining the channel section aseptic and sterile. In a preferred embodiment, the detachable wall section forms a seal between the vial attachment end 151 of the vial adapter 150 and the connector 160 of the vial adapter 150. There are other structures that would achieve similar results as the detachable wall section 173. For example, a resilient or flexible seal between the vial attachment end 151 of the vial adapter 150 and the connector 160 of the vial adapter 150 would be equivalent. Some reduction in structural rigidity would be observed. However, such a sleeve would serve to seal the connection. Similarly, an o-ring or other similar structure could be provided on the sleeve. Such structure would provide an adequate seal, however, there would also be seen a reduced mechanical strengthening.

Alternatively, it will be understood that, instead of utilizing the detachable wall section, the device can be fitted with one or more detents on the connector and a detent release lever on the vial attachment end, along with threading. This configuration would provide similar mechanical strength properties as the detachable wall section and could be easily adapted to provide for aseptic or sterile closure. Moreover, such an arrangement can be completely removed from the connector 160, providing a similar advantage as the detachable wall section 173.

In the preferred embodiment, however, the detachable wall section 173 has means, such as frangible strips 174 and pull tab 175 that allow the removal of the detachable wall section 173 from the vial adapter 150. This is advantageous, since the entire vial attachment end 151 can be removed, if desired, from the vial adapter 150, leaving only the connector 160. This allows the connector 160 to be used for attachment to another connector, such as a connector on an IV set.

Figure 13:
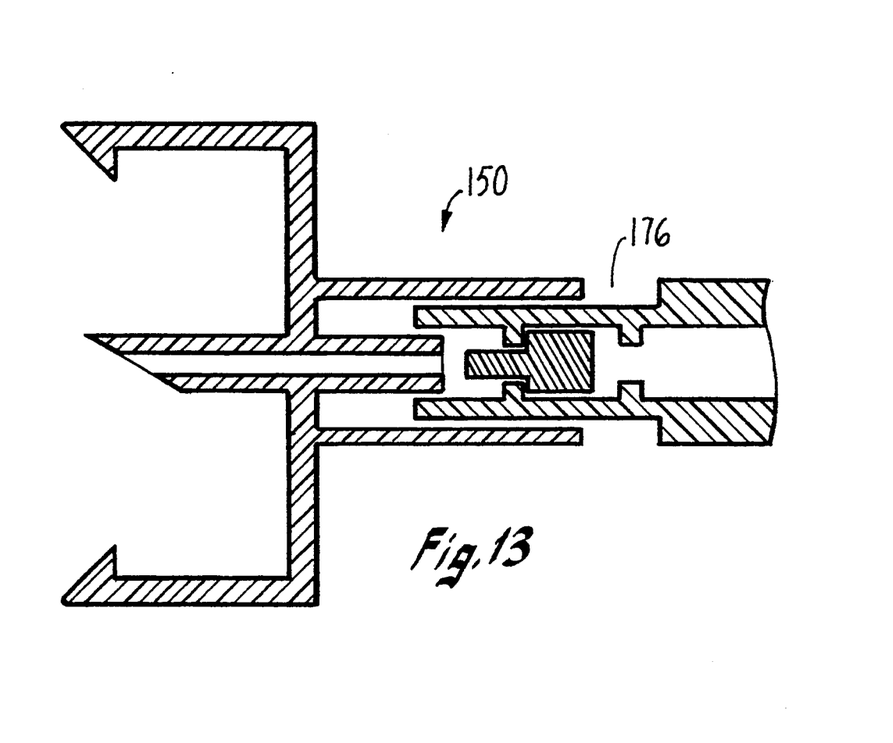
FIG. 13 is the view in FIG. 12 with the frangible strip removed.
Figure 14:
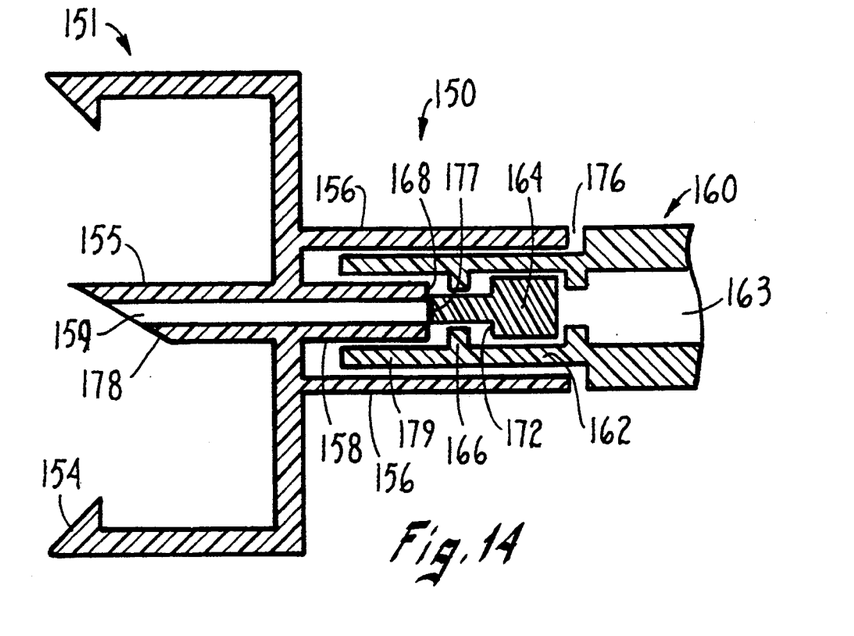
FIG. 14 is the view in FIG. 13 where the two sections of the adapter have been moved longitudinally toward each other thereby actuating the one-way valve and allowing fluid communication through the first and second lumen.

In FIG. 13, the detachable wall section 173 has been removed leaving a void section 176 in the vial adapter 150. This void section 176, as will be seen in FIG. 14, allows the vial attachment end 151 to move distally toward the connector 160, with the stem wall 156 sliding over the recessed wall area 162 on the connector 160. This distal movement operates to move the distal end 168 of the rod 158 toward the distal end 177 of the valve 164, forcing the proximal edge 172 of the valve 164 away from the proximal most circumferential tab 166 and allowing fluid to flow from the second lumen 163 in the connector 160 into the first lumen 159 and out the distal end 178 of the spike 155.

Figure 15:
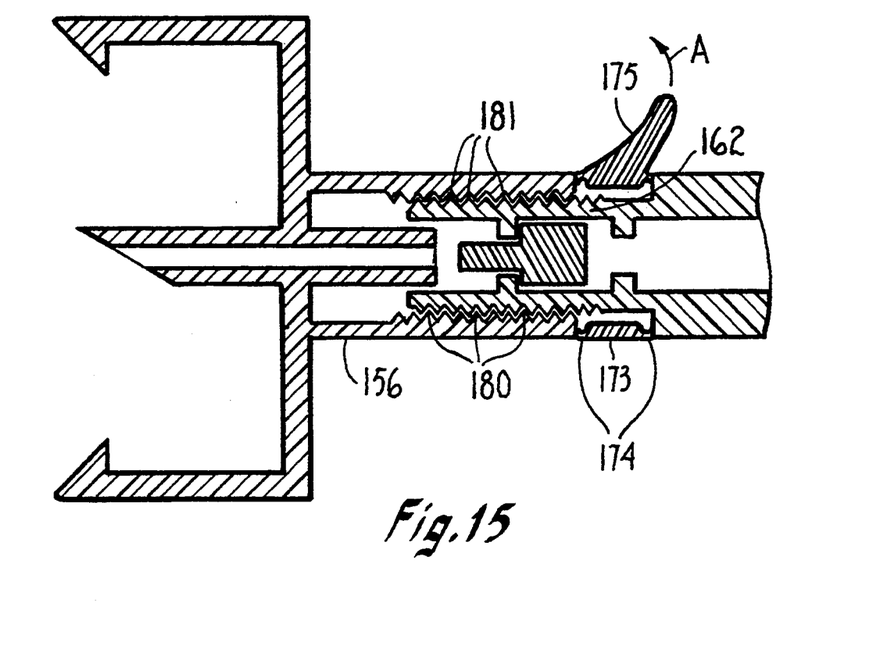
FIG. 15 is a similar view as in FIG. 12 in an embodiment where the two sections of the connector have threads.
Figure 16:
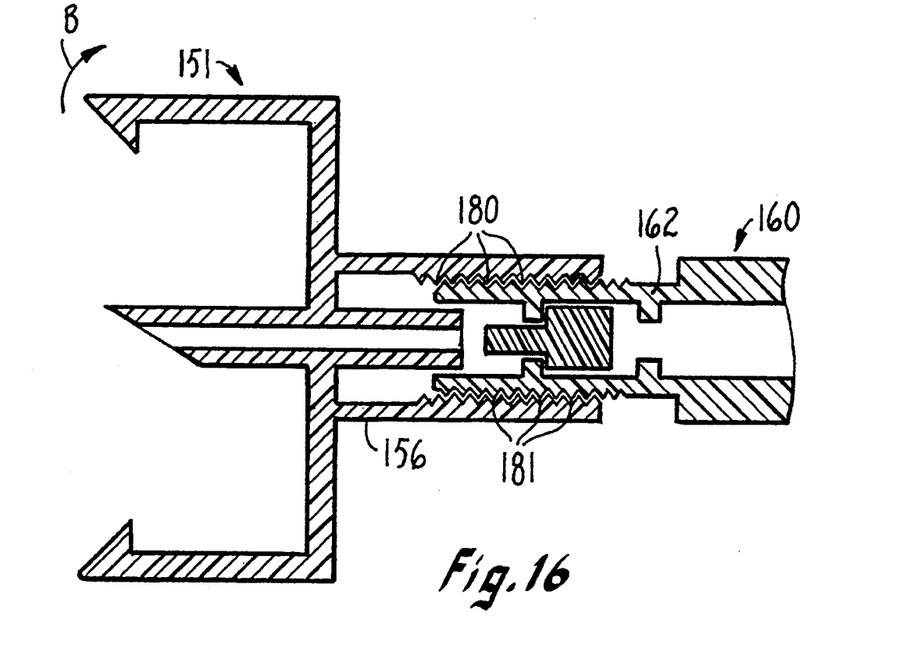
FIG. 16 is a similar view as in FIG. 13 in the embodiment shown in FIG. 15.
Figure 17:
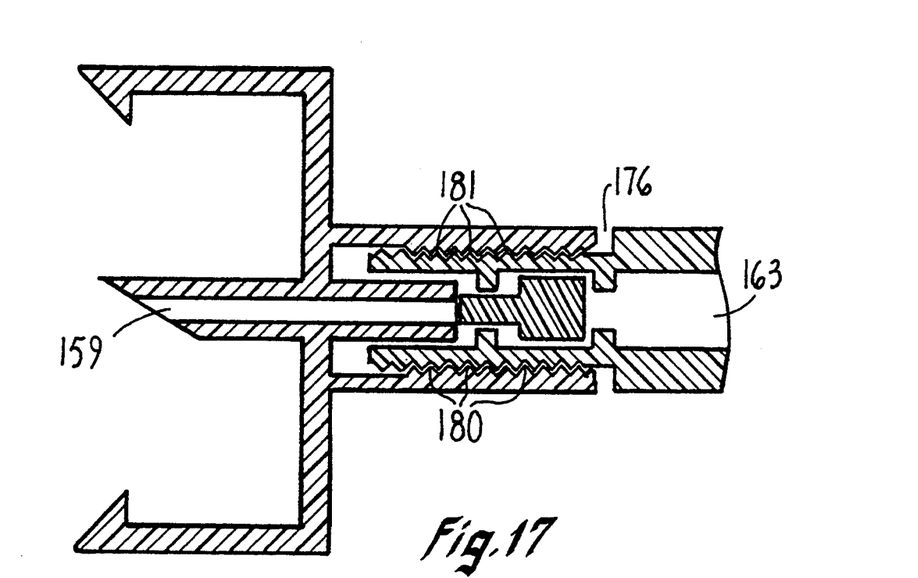
FIG. 17 is a similar view as in FIG. 14 in the embodiment shown in FIGS. 15 and 16.

As will be understood, in the above-discussed design in FIGS. 15 through 17, as easily as the vial attachment end 151 of the vial adapter 150 will slide distally toward the connector 160, it can slide proximally, falling apart. Therefore, in a preferred embodiment, the inside wall 178 of the stem wall 156 and the outside wall 179 of the recessed wall section are threaded, or are otherwise constructed so as to protect against detachment. Moreover, these designs tend to simplify the depression of the valve 164 in order to allow communication of fluid through the second and first lumens. FIGS. 15 through 17 show a model having threads 181 on the stem wall and threads 180 on the recessed wall section 162. The detachable wall section 173 is removed by pulling on pull tab 175 in the direction of arrow A. The detachable wall section will separate along frangible wall sections 174. Thereafter, in FIG. 16, the vial attachment end 151 is turned in the direction of arrow B, which turns the stem wall 156 around the recessed wall section 162 and the threads 180 and 181 will draw the stem wall 156 distally on the connector. This action, as will be seen in FIG. 17, will reduce the size of the void space 176 and also allow fluid communication between the first and second lumens 159 and 163, respectively, as discussed in more detail in connection with FIG. 14.

It will be appreciated that there are valves and valve systems that can be opened without the longitudinal motion of the vial attachment end and the connector in relation to one another. For example, there are a variety of bayonet type valve actuators. In bayonet style actuators, upon the axial twisting of one of the ends relative to the other, structure similar to the rod 158 can be caused to extend and depress the distal end of the valve. In addition, a variety of axial pressure valves are made that, when pressure is exerted external to the valve, will deform the shape of the lumen surrounding the valve closure and all fluid flow therethrough.

It will be evident from the above that there are numerous embodiments of this invention which, while not expressly described herein, are clearly within the scope and spirit of the invention. The above description and drawings are therefore intended to be exemplary only, and the scope of the invention is to be determined solely from the appended claims.

What we claim is:

1. A liquid dispensing device comprising:
   a container for fluid having an interior, an exterior, and an opening which provides fluid communication between the interior and the exterior;
   a vial having an interior, a neck, a groove in the neck, and a piercable seal;
   a connector attached to the container surrounding the opening, the connector having a hollow channel disposed therein and in fluid communication with the opening in the container, the channel having a reclosable valve disposed therein, the valve being normally closed; and
   a vial adaptor having an open proximal end, a closed distal end, a wall disposed between the distal and proximal ends, the wall comprising a flange which releasably engages the groove on the neck of the vial, and a hollow conduit passing through the closed end and having a distal end extending beyond the closed end and sized to fit within the hollow channel of said connector, and a sharp proximal end adapted to pierce the seal on the vial;
   wherein the vial fits within the open proximal end of the vial adaptor and the flange engages the groove to hold the vial in the adaptor, and the connector and adaptor slidably attach such that the distal end of the hollow conduit in the vial adaptor slides within the hollow channel in the connector and contacts the valve causing it to open, and the proximal end of the conduit pierces the seal on the vial, thereby establishing fluid communication between the interior of the container and the interior of the vial.

2. The device of claim 1, wherein the vial adaptor can be detached from the connector upon sliding movement of the connector and the adaptor away from each other.

3. The device of claim 1, wherein the adaptor further comprises a second wall extending distally past the distal end and having an interior surface having a locking Luer fitting and wherein said connector further comprises a corresponding locking Luer fitting, such that the adaptor and the connector can be releasably joined by interlocking the Luer fittings.

4. The device of claim 1, further comprising a removable wall section disposed between the vial adaptor and the connector, the removable wall section forming a seal between the adaptor and the connector and acting to prevent the adaptor and the connector from sliding toward each other and opening the valve.

5. The device of claim 1, further comprising an O-ring disposed between the vial adaptor and the connector, the O-ring forming a seal between the vial adaptor and the connector.

6. The device of claim 1, wherein the hollow channel within the connector is the sole outlet port for the interior of the container.

7. The device of claim 1, wherein the conduit comprises a needle having a channel disposed longitudinally therein.

8. The device of claim 1, wherein said conduit comprises a needle having a channel formed in one side of the needle.

9. A system for connecting a diluent source within a first container to a vial containing a medication, comprising:
   a vial adaptor having an open proximal end, a distal end, and a wall section between said proximal end and said distal end, wherein the wall section comprises a flange adapted to releasably engage a corresponding groove on the vial,
   said vial adaptor further comprising a conduit attached at said distal end of said vial adaptor, said conduit having a distal end and a sharp proximal end adapted to pierce a seal on said vial, said conduit further defining a first lumen that extends from the proximal end of the conduit through the distal end of the vial adaptor; said vial adaptor further comprising a second wall section forming a channel that extends distally past the distal end of said conduit; and
   a connector having a proximal end, a distal end and a third wall section disposed between said proximal and said distal ends, wherein the proximal end comprises a recessed wall section sized to fit within the channel formed by said second wall section of said adaptor, said connector having a second lumen extending therethrough and wherein said distal end of said connector is adapted to attach to said container; said connector further comprising a reclosable valve that is ordinarily closed to prevent fluid communication through said second lumen;
   said vial adaptor and said connector being adapted to releasably and sealingly connect at the distal end of said adaptor and the proximal end of said connector, such that said recessed wall section slides within the channel formed by said wall section upon sliding movement of the distal end of the adaptor and the proximal end of the connector towards each other such that said conduit contacts said valve causing it to open to allow fluid communication through said valve and said first and second lumen.

10. The system of claim 9, wherein the vial adaptor can be removed from said connector upon sliding movement of the proximal end of the connector and the distal end of the adaptor away from each other.

11. The system of claim 9, wherein said adaptor further comprises a locking Luer fitting on its distal end and wherein said connector further comprises a corresponding locking Luer fitting on its proximal end, such that said adaptor and said connector can be releasably joined by interlocking said Luer fittings.

12. The system of claim 9, further comprising a removable wall section disposed between said vial adaptor and said connector, said removable wall section forming a seal between said adaptor and said connector and acting to prevent said adaptor and said connector from moving longitudinally with respect to one another.

13. The system of claim 9, wherein said second lumen within said connector, when attached to said container, is the sole outlet port for said diluent source within said first container.

14. A liquid dispensing device comprising:
   a hollow casing having inner and outer sides, said inner side defining an interior which can contain a fluid;
   an opening in said casing providing fluid communication between said interior and the exterior of said casing;
   a hollow sleeve surrounding said opening and extending outwardly from said outer side, said sleeve having an interior;
   an reclosable valve on the interior of said sleeve, said valve being normally closed and being openable only from outside said casing;
   a flange on the interior of said sleeve for releasably engaging a groove on a neck of a vial, said vial having an interior which can contain a medicament and a piercable seal which provides fluid communication between the interior and exterior of said vial;
   a conduit having a sharp distal end at least partially within said sleeve which pierces said seal and a proximal end in fluid communication with the interior of said hollow casing, such that when said distal end pierces said seal, fluid communication is established between said interiors of said hollow casing and said vial; and
   a second flange within said sleeve and spaced apart from said first flange, said second flange also engagable with said groove on said vial, and spaced apart from said seal a sufficient distance such that when said vial is inserted into said sleeve, said second flange engages the groove on the vial such that the vial and said sleeve are secured together but said conduit does not contact said seal and no fluid communication exists between said interiors of said vial and said hollow casing.

15. The device of claim 14, wherein said conduit comprises a needle having a channel disposed longitudinally therein.

16. The device of claim 14, wherein said conduit comprises a needle having a channel formed in one side of said needle.

17. An adaptor for releasably joining a vial with a liquid delivery device, comprising:
   a vial adaptor comprising a front open end sized to receive a neck of said vial, a flange for engaging a corresponding groove on said vial, a back closed end, a wall having an inner and outer surface extending distally from said closed end to form a channel, a hollow needle extending through said back end and into said channel; and
   a connector comprising an outer wall having a proximal end and a distal end and a recessed wall sized to fit within the channel formed by the wall of said vial adaptor and having an inner and outer surface, said recessed wall extending proximately from said outer wall and forming a lumen to receive the needle such that fluid communication is achieved between the needle and said lumen, and wherein a reclosable valve is located within said lumen, and wherein said outer wall is adapted to be releasably connected to an opening in said liquid delivery device.

18. The adaptor of claim 17, further comprising a detachable wall disposed at the proximal end of said outer wall of said connector, wherein said detachable wall forms a seal between the vial adaptor and the connector and acts to prevent the vial adaptor and connector from moving slidably with respect to one another.

19. The adaptor of claim 17, wherein said recessed wall further comprises threads on the outer surface of the recessed wall and said adaptor further comprises threads on the interior surface of said wall, such that said vial adaptor and said connector may be joined through the interlocking of said threads.

20. The adaptor of claim 17, further comprising an O-ring disposed at the proximal end of said outer wall of said connector, said O-ring forming a seal between the vial adaptor and the connector.

* * * * *